(12) United States Patent
Stracquadaini et al.

(10) Patent No.: US 10,218,279 B2
(45) Date of Patent: Feb. 26, 2019

(54) METHODS AND CIRCUITRY FOR OPERATING SWITCHING POWER SUPPLIES BASED ON SWITCHING FREQUENCY COMPARISON

(71) Applicant: Texas Instruments Incorporated, Dallas, TX (US)

(72) Inventors: Rosario Stracquadaini, San Gregorio di Catania (IT); Antonio Amoroso, Tremestieri Etneo (IT); Salvatore Giombanco, Cassaro (IT)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 15/334,855

(22) Filed: Oct. 26, 2016

(65) Prior Publication Data

US 2018/0115249 A1 Apr. 26, 2018

(51) Int. Cl.
| | |
|---|---|
| H02M 3/335 | (2006.01) |
| H02M 1/32 | (2007.01) |
| H02M 1/08 | (2006.01) |
| H02M 1/00 | (2006.01) |

(52) U.S. Cl.
CPC ......... H02M 3/33515 (2013.01); H02M 1/08 (2013.01); H02M 1/32 (2013.01); H02M 3/335 (2013.01); H02M 3/33507 (2013.01); H02M 2001/0009 (2013.01)

(58) Field of Classification Search
CPC ..... H02M 1/32; H02M 3/335; H02M 3/33507
See application file for complete search history.

(56) References Cited

U.S. PATENT DOCUMENTS

| | | | |
|---|---|---|---|
| 6,188,587 B1 | 2/2001 | Yun et al. | |
| 2011/0133711 A1* | 6/2011 | Murakami | H03K 17/0822 323/282 |
| 2012/0153919 A1* | 6/2012 | Garbossa | H02M 3/156 323/284 |
| 2013/0094254 A1* | 4/2013 | Huang | H02M 1/4258 363/21.16 |
| 2013/0329462 A1* | 12/2013 | Duvnjak | H02M 3/33523 363/15 |

(Continued)

FOREIGN PATENT DOCUMENTS

GB  2488456 A  8/2012

OTHER PUBLICATIONS

Notification of Transmittal of the International Search Report and the Written Opinion of the International Searching Authority, or the Declaration. dated: Mar. 15, 2018, 6 pages.

*Primary Examiner* — Timothy J Dole
*Assistant Examiner* — Ishrat Jamali
(74) *Attorney, Agent, or Firm* — Tuenlap Chan; Charles A. Brill; Frank D. Cimino

(57) ABSTRACT

Controllers and methods for controlling power supplies are disclosed herein. An example of a controller includes comparison circuitry operable to compare a switching frequency of the controller to a predetermined switching frequency. Voltage measuring circuitry is operable to measure the output voltage of the power supply. Circuitry is operable to disable at least one component in the power supply in response to the switching frequency being less than the predetermined switching frequency and the output voltage being greater than a predetermined output voltage.

17 Claims, 7 Drawing Sheets

(56) References Cited

U.S. PATENT DOCUMENTS

2014/0153297 A1 6/2014 Balakrishnan et al.
2016/0172986 A1* 6/2016 Hayakawa ........ H02M 3/33523
　　　　　　　　　　　　　　　　　363/21.15

* cited by examiner

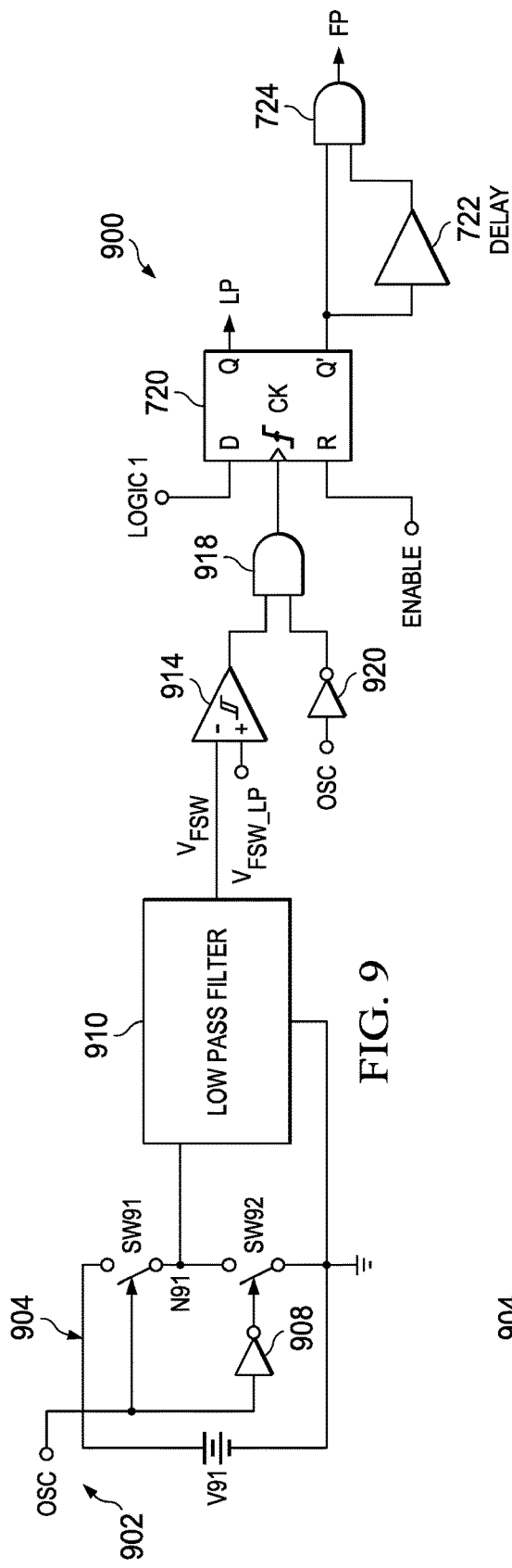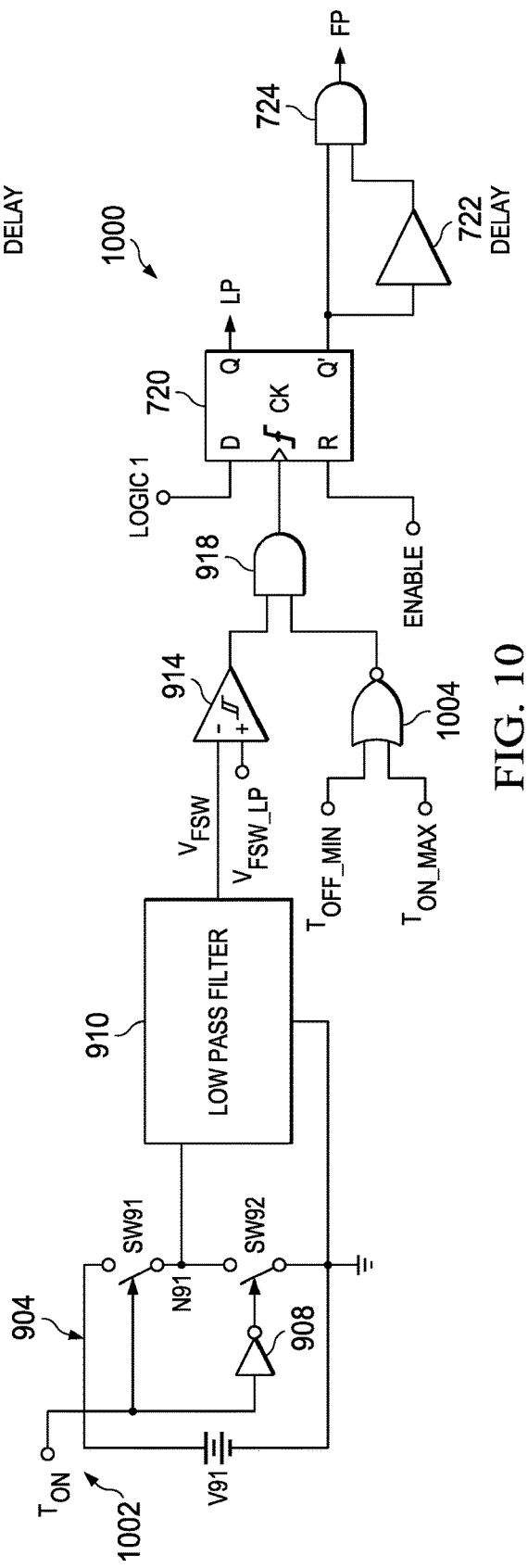

METHODS AND CIRCUITRY FOR OPERATING SWITCHING POWER SUPPLIES BASED ON SWITCHING FREQUENCY COMPARISON

BACKGROUND

Switching power supplies generate an output voltage on the secondary side of a transformer by switching the current flow through the primary side of the transformer. A simple control method for switching power supplies is the on/off control, wherein switching is based on a control loop between the primary and secondary sides of the transformer. The on/off control does not need control loop compensation, but rather only needs one comparator to close the loop. If the output voltage is below a reference voltage measured by the comparator, switching is enabled, which increases the output voltage. When the output voltage is greater than the reference voltage, switching is disabled, which causes the output voltage to decrease. In some embodiments, the switching frequency and the duty cycle of the switching are fixed and each time the output voltage exceeds the reference voltage, switching is disabled.

SUMMARY

Controllers and methods for controlling power supplies are disclosed herein. An example of a controller includes comparison circuitry operable to compare a switching frequency of the controller to a predetermined switching frequency. Voltage measuring circuitry is operable to measure the output voltage of the power supply. Circuitry is operable to disable at least one component in the power supply in response to the switching frequency being less than the predetermined switching frequency and the output voltage being greater than a predetermined output voltage.

BRIEF DESCRIPTION OF THE DRAWINGS

FIG. 9 is a schematic diagram of circuitry showing another example of the power control circuitry of FIG. 5.

FIG. 10 is a schematic diagram of circuitry that is a variation of the power control circuitry of FIG. 9.

DETAILED DESCRIPTION

Figure 1:
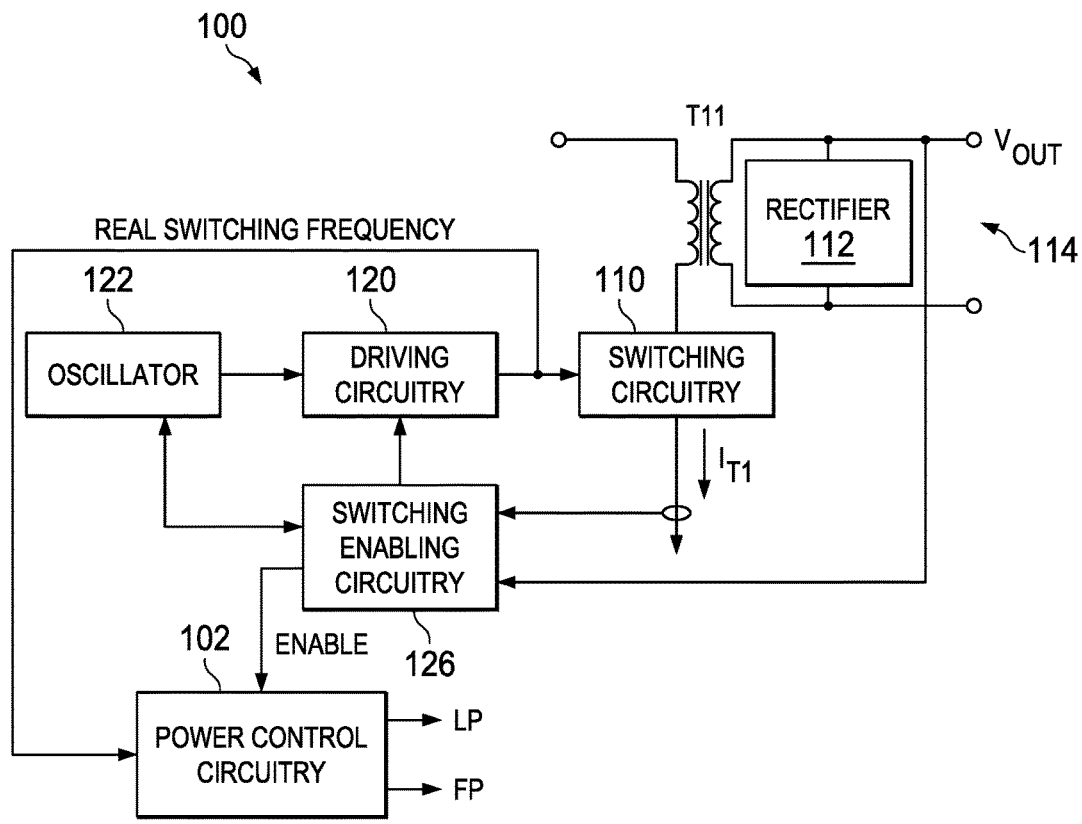
FIG. 1 is a block diagram of a power supply with power control circuitry associated therewith.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure. The circuits and methods described herein may function in conjunction with existing power supplies to disable or deactivate certain components when the components are not in use.

FIG. 1 is a block diagram of a power supply 100 with power control circuitry 102 associated therewith. The power supply 100 operates in the on/off control technique as described herein. The power supply 100 includes switching circuitry 110 that controls a current $I_{T1}$ passing through the primary side of a transformer T11 as described herein. Switching circuitry 110 includes a switch, such as a transistor, that selectively enables the current $I_{T1}$ to flow and prevents the current $I_{T1}$ from flowing. The period when the current $I_{T1}$ flows is sometimes referred to as the conducting period. A rectifier 112 is coupled to the secondary side of the transformer T11 and provides an output voltage $V_{OUT}$ to an output 114 of the power supply 100. Driving circuitry 120 drives the switching circuitry 110 and may include drivers, flip-flops, and other components. An oscillator 122 generates a signal at a switching frequency $F_{SW}$ that drives the switching circuitry 110. When the switching circuitry 110 is enabled, it switches the current $I_{T1}$ at a frequency referred to as the real switching frequency. The oscillator 122 may include timers and other components described herein. Switching enabling circuitry 126 includes circuitry that enables the switching circuitry 110 under certain conditions as described herein. Enabling of the switching circuitry 110 is in response to a low power signal LP and a full power signal FP generated by the power control circuitry 102 as described in detail below.

Figure 2:
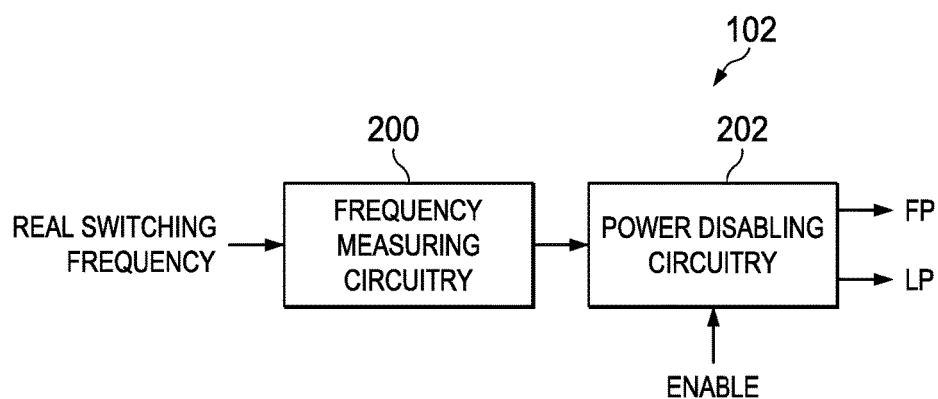
FIG. 2 is a block diagram of an example of power control circuitry.

FIG. 2 is a block diagram of an example of the power control circuitry 102 of FIG. 1. The power control circuitry 102 includes frequency measuring circuitry 200 that is coupled to a frequency signal indicative of the real switching frequency. Power disabling circuitry 202 is coupled to the frequency measuring circuitry 200 and receives an enable signal described below. The enable signal is generated by the switching enabling circuitry 126 of FIG. 1. The power disabling circuitry 202 generates the full power signal FP and the low power signal LP in response to the enable signal and the output of the frequency measuring circuitry 200. The frequency measuring circuitry 200 measures the real switching frequency and generates a signal indicative of the real switching frequency. The power disabling circuitry 202 analyzes the real switching frequency and the enable signal and generates the full power signal FP and the low power signal LP in response to the analysis. In other examples, the power disabling circuitry 202 analyzes other signals generated by the power supply 100.

Figure 3:
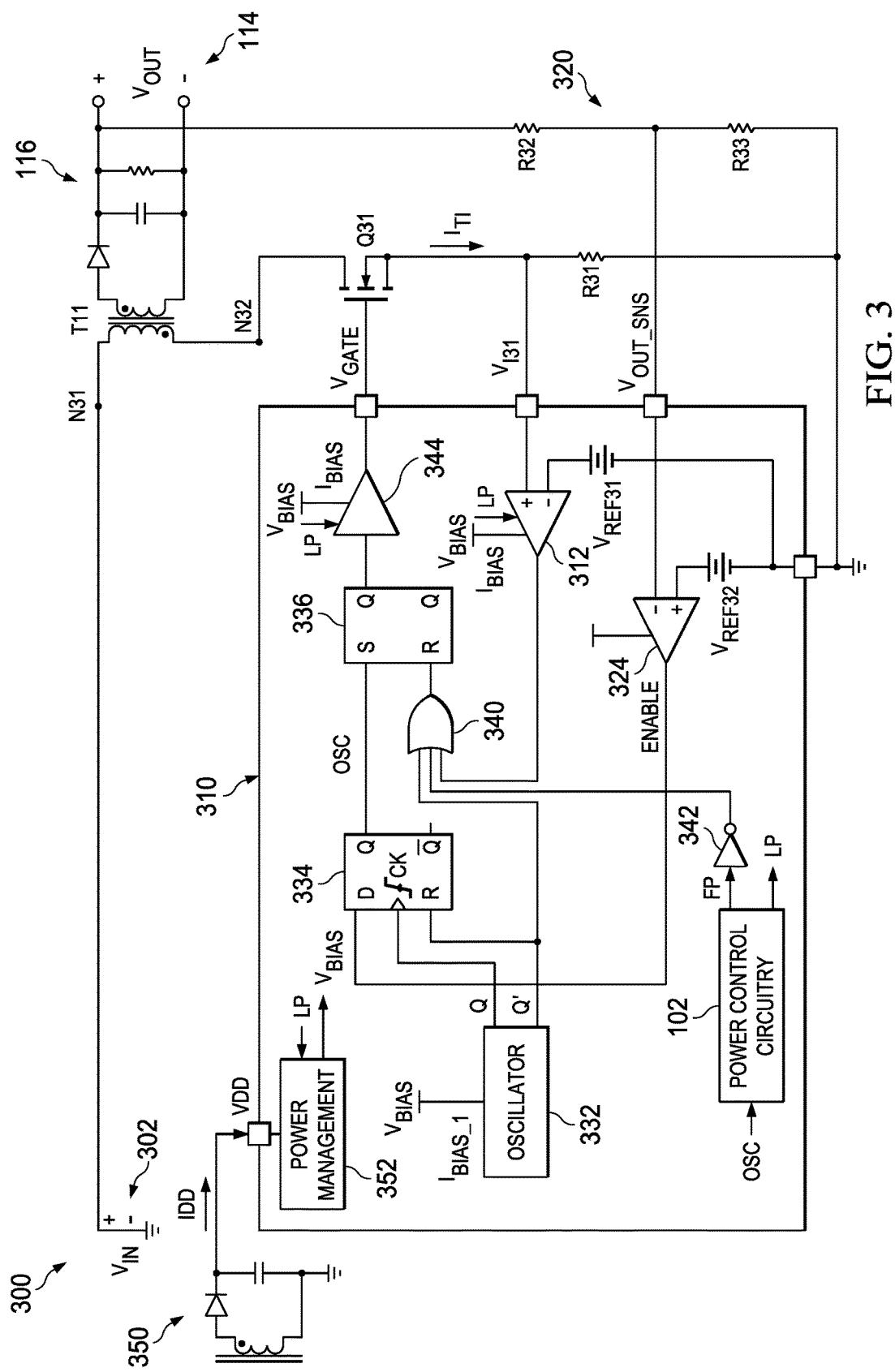
FIG. 3 is a schematic diagram of an example of a switching power supply.

FIG. 3 is a schematic diagram of an example of a switching power supply 300 that functions as the power supply 100 of FIG. 1. The power supply 300 includes an input 302, wherein an input voltage $V_{IN}$ is present at the input 302 during operation of the power supply 300. The input 302 is coupled to a first node N31 on the primary side of the transformer T11. A second node N32 of the primary side of the transformer T11 is coupled to a switching transistor Q31 that regulates the current $I_{T1}$ flowing through the primary side of transformer T11. Transistor Q31 offers negligible impedance when it is in an on state. Transistor Q31 enables current $I_{T1}$ to flow through the primary side of transformer T11 when transistor Q31 is on and transistor Q31 stops current $I_{T1}$ when it is off. The gate of transistor Q31 is driven by control circuitry (sometimes referred to as a controller) 310 that periodically drives transistor Q31 on and off at the real switching frequency as described above.

Transistor Q31 is coupled to a common node, such as ground, by way of a resistor R31. The common node is a voltage potential that operates at a voltage that is less than or different than the input voltage $V_{IN}$. The current $I_{T1}$ flows through resistor R31 and generates a voltage $V_{R31}$ that is proportional to the current $I_{T1}$. The voltage $V_{R31}$ is compared to a reference voltage $V_{REF31}$ by a comparator 312. The comparator 312 generates a signal indicating whether the current $I_{T1}$ flowing through transistor Q31 and the primary side of transformer T11 has exceeded a predetermined value established by the reference voltage $V_{REF31}$. Other examples of the power supply 300 may use other current sensing circuitry that measures the current $I_{T1}$ or circuitry that determines if the current $I_{T1}$ has exceeded a predetermined value.

The secondary side of the transformer T11 is coupled to the output 114 by way of the rectifier 116, wherein the output voltage $V_{OUT}$ is present at the output 114 during operation of the power supply 300. Voltage sensing circuitry 320 consisting of resistors R32 and R33 is coupled to the output 114. The voltage sensing circuitry 320 generates a sensed voltage $V_{OUT\_SNS}$ that is proportional to the output voltage $V_{OUT}$. The sensed voltage $V_{OUT\_SNS}$ is compared to a reference voltage $V_{REF32}$ by way of a comparator 324. Different variations of the voltage sensing circuitry 320 other than the resistive voltage divider may be employed within the power supply 300. For example, signals other than the voltages $V_{OUT\_SNS}$ and $V_{REF32}$ may be implemented.

The comparator 324 generates the enable signal. If the sensed voltage $V_{OUT\_SNS}$ is greater than the reference voltage $V_{REF32}$, the enable signal disables the control circuitry 310 from turning on transistor Q31, which prevents the output voltage $V_{OUT}$ from increasing. If the sensed voltage $V_{OUT\_SNS}$ is less than the reference voltage $V_{REF32}$, the enable signal enables the control circuitry 310 to turn on transistor Q31, which increases the output voltage $V_{OUT}$. In a similar manner, if the voltage $V_{R31}$ is greater than the reference voltage $V_{REF31}$, then the current $I_{T1}$ is excessive, so the comparator 312 generates a signal that turns off transistor Q31.

Figure 4:
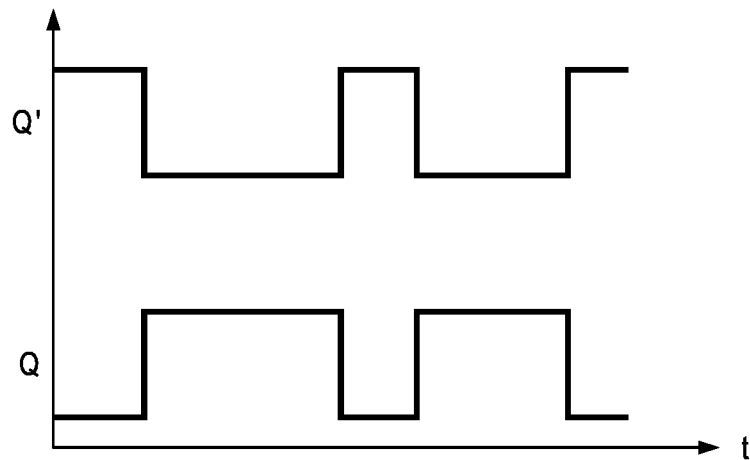
FIG. 4 is graphs of example signals generated by the oscillator of FIG. 1.

The control circuitry 310 includes an oscillator 332 that generates reference signals for switching transistor Q31 at the switching frequency $F_{SW}$. FIG. 4 shows graphs of example signals for Q and Q', which are complementary signals generated by the oscillator 332.

The signal Q generated by the oscillator 332 is coupled to the clock input of a D flip-flop 334. The output of the comparator 324 is the enable signal and is coupled to the D input of the flip-flop 334. The reset input of the flip-flop 334 is coupled to the signal Q' generated by the oscillator 332. If the enable signal output from the comparator 324 is high, meaning that the voltage $V_{OUT\_SNS}$ is less than the reference voltage $V_{REF32}$, then the output voltage $V_{OUT}$ needs to be increased. The high output (high enable signal) generated by the comparator 324 in this situation is input to the D input of the flip-flop 334 that will eventually cause transistor Q31 to turn on. The Q output of the flip-flop 334 is therefore the same signal as the signal Q generated by the oscillator 332 when the enable signal is high.

The output Q of the flip-flop 334 is referred to as the OSC signal and is coupled to the S input of an S/R flip-flop 336. The reset input of the flip-flop 336 is coupled to the output of an OR gate 340. A first input of the OR gate 340 is coupled to the Q' output of the oscillator 332 and a second input of the OR gate 340 is coupled to the output of the comparator 312. A third input of the OR gate 340 is coupled to the full power signal FP, as described further below, by way of an inverter 342. A driver 344 is coupled between the Q output of the flip-flop 336 and the gate of transistor Q31 and serves to drive the gate to turn on transistor Q31. A first condition that causes the flip-flop 336 to reset occurs when the output Q' of the oscillator 332 transitions high, meaning that the output Q of the oscillator 332 is low, so transistor Q31 should be off. A second condition that causes the flip-flop 336 to reset occurs when the voltage $V_{R31}$ exceeds the reference voltage $V_{REF31}$, which is caused by the current $I_{T1}$ flowing through the primary side of transistor T11 being excessive. During these excessive current situations, the control circuitry 310 turns transistor Q31 off. A third condition that causes the flip-flop 336 to reset occurs when the full power signal FP is low as described below.

A power source 350 provides power to the control circuitry 310 in the form of a voltage VDD and a current IDD. The control circuitry 310 is coupled to or includes power management circuitry 352 that receives the power generated by the power source 350 and distributes it to components in the control circuitry 310. The power management circuitry 352 distributes a voltage $V_{BIAS}$ to certain components in the control circuitry 310 as noted and they all draw a bias current $I_{BIAS}$. The power management circuitry 352 reduces or eliminates power supplied to components within the control circuitry 310 when they are not active, which increases the efficiency of the power supply 300 relative to conventional power supplies.

Figure 5:
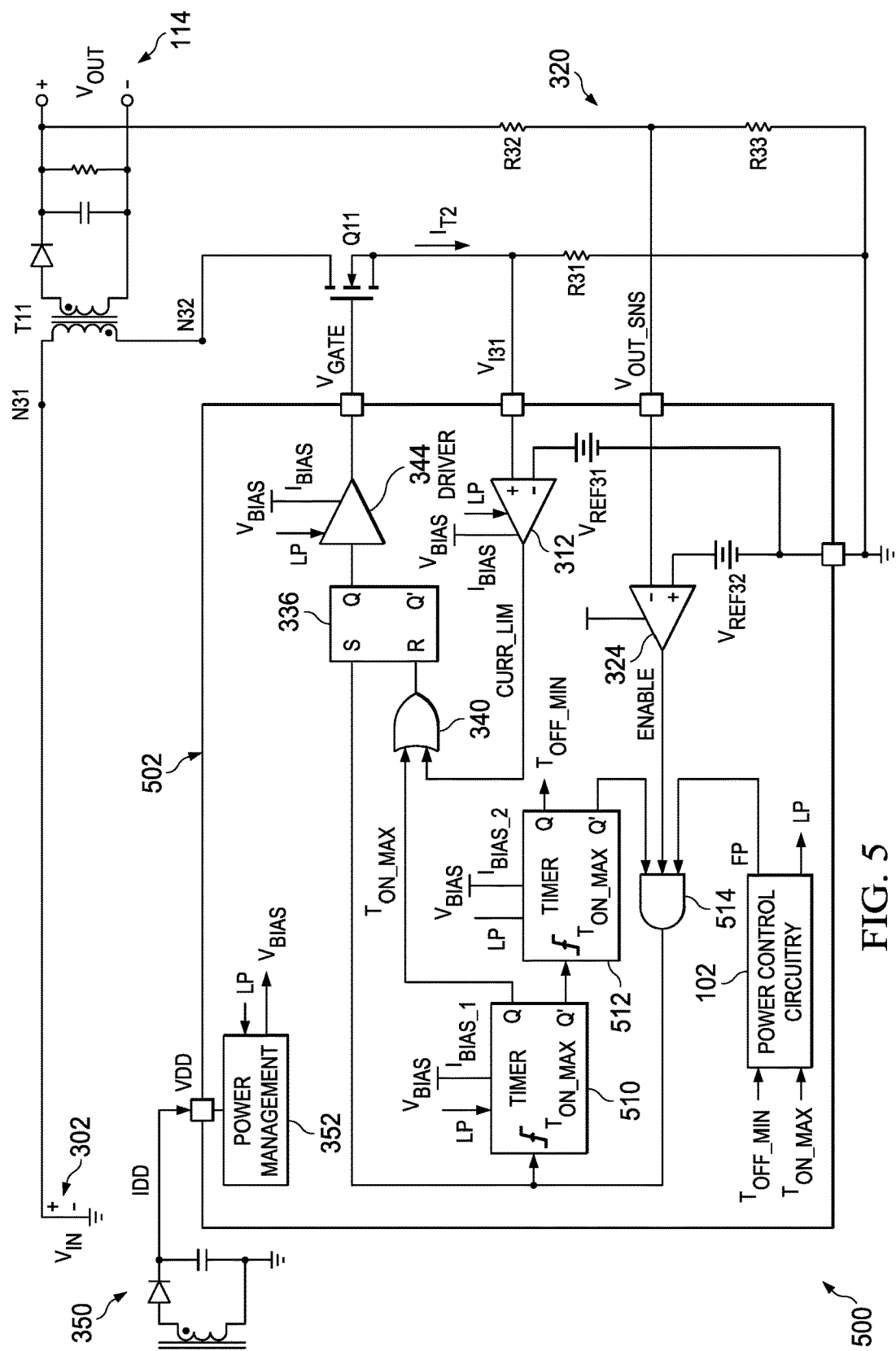
FIG. 5 is a schematic diagram of another example of a switching power supply wherein the switching frequency is not fixed.

FIG. 5 is a schematic diagram of another example power supply 500 having control circuitry (sometimes referred to as a controller) 502 and operating at a switching frequency that is not fixed. The power supply 500 is similar to the power supply 300 of FIG. 3 except components in the control circuitry 310, such as the oscillator 332 and D flip-flop 334 of FIG. 3 have been replaced with a first timer 510, a second timer 512, and an AND gate 514. The remaining components of the power supply 500 are the same as the power supply 300 and use the same reference numerals. The output of the comparator 324 is coupled to a first input of the AND gate 514 and the Q' output of the second timer 512 is coupled to the second input of the AND gate 514. The full power signal FP generated by the power control circuitry 102 is coupled to a third input of the AND gate 514. The output of the AND gate 514 is coupled to the S input of the S/R flip-flop 336 and to the clock input of the first timer 510. The Q output of the first timer 510 is coupled to a first input of the OR gate 340 and is sometimes referred to as the $T_{ON\_MAX}$ signal. The Q' output of the first timer 510 is coupled to the clock input of the second timer 512. The Q output of the second timer 512 is sometimes referred to herein as the $T_{OFF\_MIN}$ signal as described below.

Figure 6:
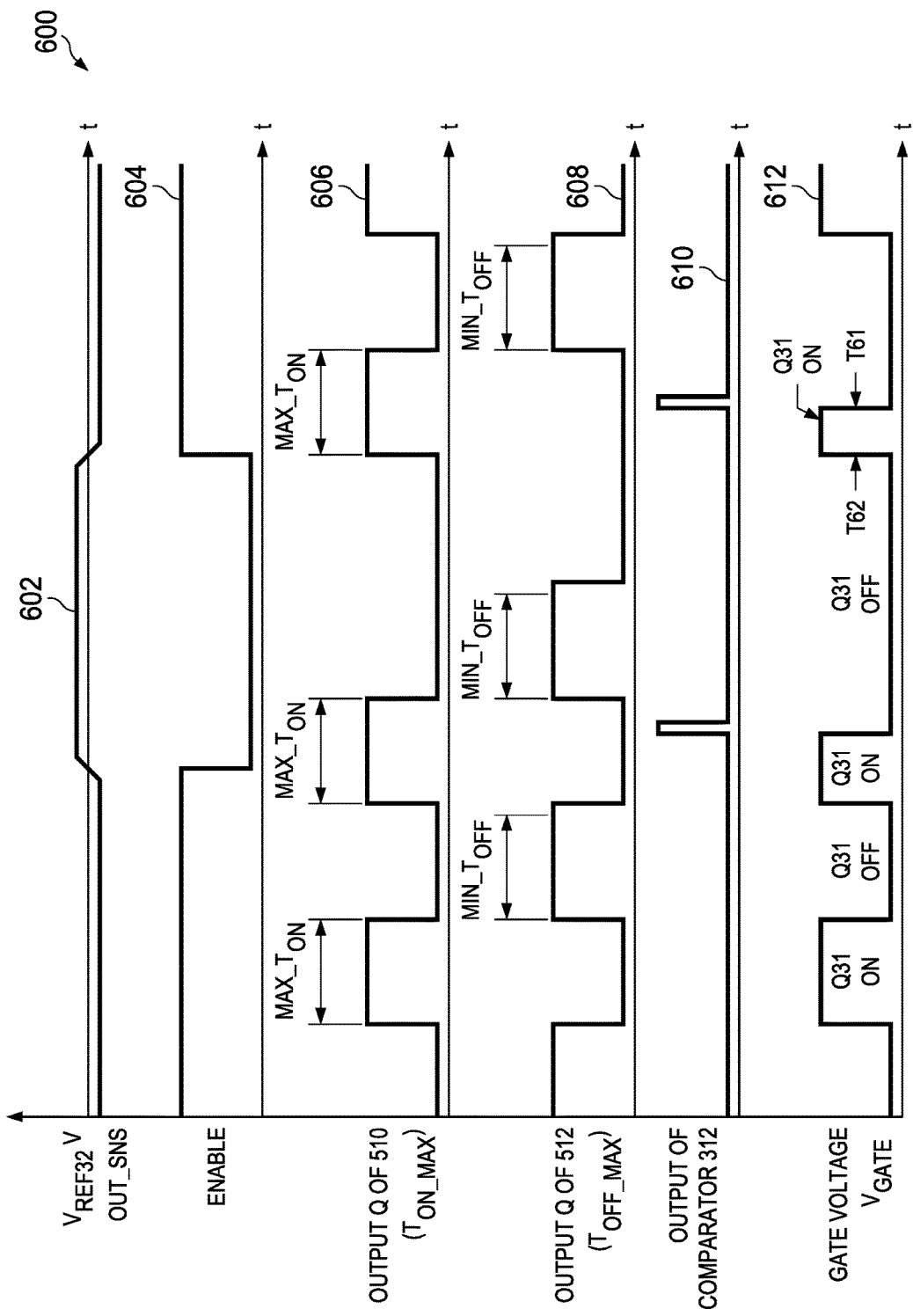
FIG. 6 is a timing diagram showing example signals generated by the power supply of FIG. 3.

FIG. 6 is a timing diagram 600 showing example signals generated by the power supply 500 of FIG. 5. A graph 602 shows an example voltage $V_{OUT\_SNS}$ relative to the reference voltage $V_{REF32}$. As described below, certain signals are generated within the control circuitry 502 in response to the relation between the voltage $V_{OUT\_SNS}$ and the reference voltage $V_{REF32}$. A graph 604 shows the enable signal generated by the comparator 324. As shown, the enable signal is high when the voltage $V_{OUT\_SNS}$ is less than the reference voltage $V_{REF32}$ and low when the voltage $V_{OUT\_SNS}$ is greater than the reference voltage $V_{REF32}$. A graph 606 shows an example of the Q output of the first timer 510 and a graph 608 shows an example of the Q output of the second timer 512. The output Q of the first timer 510 is the signal $T_{ON\_MAX}$ and has high periods referred to as MAX_$T_{ON}$. The output Q of the second timer 512 is the signal $T_{OFF\_MAX}$ and has high periods referred to as MIN_$T_{OFF}$. A graph 610 shows an example of the output of the comparator 312, which depicts when the current $I_{T1}$ exceeds a predetermined value. In the example graph 610, the current $I_{T1}$ exceeds the predetermined value when the output of the comparator 312 is high. A graph 612 provides examples of the gate voltage $V_{GATE}$ at the gate of transistor Q31. When the gate voltage $V_{GATE}$ is high, transistor Q31 conducts the current $I_{T1}$.

As shown by the timing diagram 600, when the enable signal of graph 604 is low, the gate voltage $V_{GATE}$ cannot rise. The gate voltage $V_{GATE}$ may stay high for a cycle that completes when the signal $T_{ON\_MAX}$ generated by the first timer 510 transitions low, but it cannot rise again so long as the enable signal shown by graph 604 is low. In the example timing diagram 600, the current limit has been met at a time t61 while the enable signal of graph 604 is high. This combination causes the gate voltage $V_{GATE}$ to drop to zero, immediately turning off transistor Q31. As further noted in the timing diagram 600 at time t62, the signal $T_{ON\_MAX}$ generated by the first timer 510 as shown by graph 606 is disabled when the enable signal of graph 604 is low. Once the enable signal transitions high, the signal $T_{ON\_MAX}$ generated by the first timer 510 transitions high causing the gate voltage $V_{GATE}$ to transition high and enabling the current $I_{T1}$ to flow.

With additional reference to FIGS. 3 and 5, during periods when the control circuitry 310 or 502 is inactive, the current IDD drawn from the power source 350 is reduced. For example, components within the control circuitry 310 or 502 may not remain active when the control circuitry 310 or 502 is keeping transistor Q31 in an off state. Accordingly, the control circuits 310 and 502 draw only power that is necessary when the only function of the control circuitry 310 and 502 is to keep transistor Q31 in an off state and continuously sensing the output voltage $V_{OUT}$. For example, there is no need to keep the comparator 312 active because no current is flowing through transistor Q31 when it is in the off state and so the control circuitry 310 and 502 does not need to monitor the voltage $V_{J11}$ to determine if it exceeds the voltage $V_{REF31}$.

Figure 7:
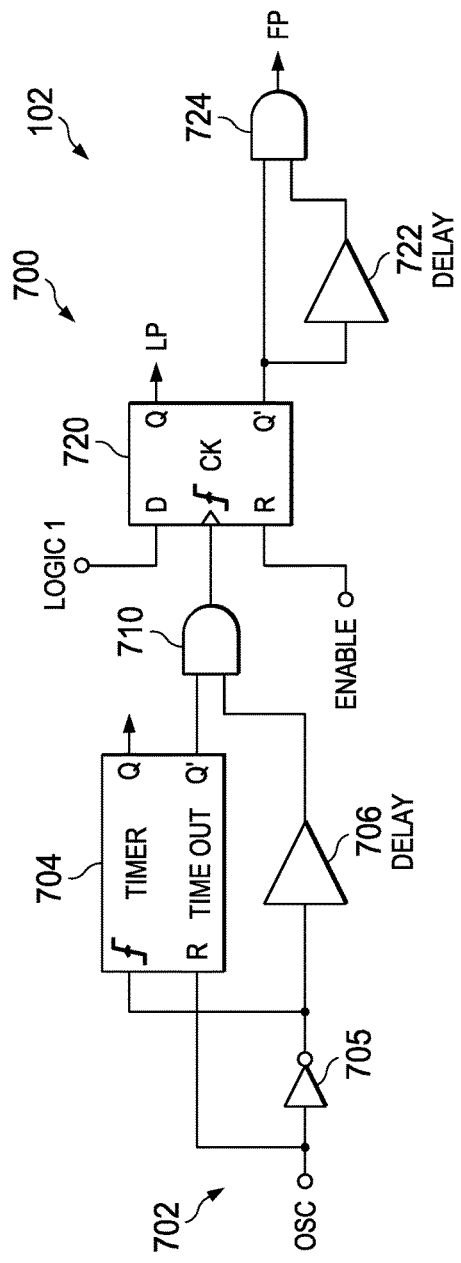
FIG. 7 is a schematic diagram of circuitry depicting an example of the power control circuitry of FIG. 5.

FIG. 7 is a schematic diagram of circuitry 700 depicting an example of the power control circuitry 102 of FIG. 3. The circuitry 700 includes an input 702 coupled to a signal that is related to the real switching frequency, which is the switching frequency of transistor Q31, such as the OSC signal of FIG. 3. The input 702 is coupled to the reset input of a timer 704 and the input of an inverter 705. The output of the inverter 705 is coupled to the input of the timer 704 and to the input of a delay 706 that serves as a deglitch delay. The output of the delay 706 and the Q' output of the timer 704 are coupled to an AND gate 710. The timer 704, the AND gate 710, and the associated components constitute the frequency measuring circuitry 200 of FIG. 2. The Q' output of the timer 704 transitions low, if not already low, as soon as transistor Q31 is switched on, which starts a switching period of transistor Q31. After a pre-set time (time set by timer 704) the timer output Q' transitions high if in the meantime another transistor Q31 switching period has not started. If no switching period has started, it means that the OSC signal is low, the output of inverter 705 is high, and the output of deglitch delay 706 is high and the output Q' of timer is high.

The output of the AND gate 710 is coupled to the clock input of a D flip-flop 720. The reset input of the flip-flop 720 is coupled to the enable signal and the D input is coupled to a logic-one voltage. The Q output of the flip-flop 720 is the low power signal LP that indicates that the components of the power supply 300, FIG. 3, may enter the low power mode. The Q' output of the flip-flop 720 is coupled to a delay 722 and a first input of an AND gate 724. The second input of the AND gate 724 is coupled to the output of the delay 722. The logic circuit formed by the delay 722 and the AND gate 724 ensures that when the low power signal LP output by the flip-flop 720 transitions high, the full power signal FP transitions high with a delay. When the low power signal LP output by the flip-flop 720 transitions low it goes low immediately, without a delay. The output of the AND gate 724 is the full power signal FP indicating that all components of the power supply 300 are to operate at full power. The FP and LP signals are used in the power supply 300 as described in detail herein.

Figure 8:
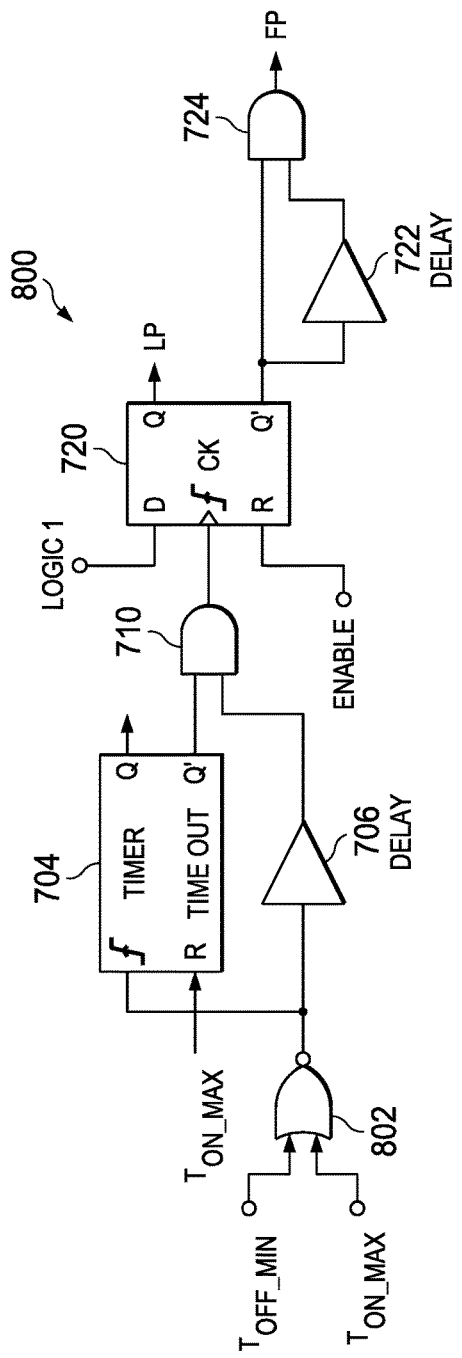
FIG. 8 is a schematic diagram of a variation to the circuitry of FIG. 7 with a different input signal.

FIG. 8 is a schematic diagram of circuitry 800, which is a variation of the circuitry 700 of FIG. 7 with a different input applicable to the power supply 500 of FIG. 5, which has a variable switching frequency. The circuitry 800 includes a NOR gate 802 in place of the inverter 705 of FIG. 7. The inputs of the NOR gate 802 are coupled to the $T_{OFF\_MIN}$ and $T_{ON\_MAX}$ signals, so the output of the NOR gate 802 is high if the switching signal is active. The reset input of the timer 704 is coupled to the $T_{ON\_MAX}$ signal. The circuitry 800 functions in the same manner as the circuitry 700 of FIG. 7, but using different input signals.

FIG. 9 is a schematic diagram of circuitry 900 showing an example of the power control circuitry 102 of FIG. 3. In summary, the circuitry 900 converts the real switching frequency represented by the OSC signal to a signal that may be processed by the circuitry 900. The circuitry 900 analyzes the real switching frequency along with the state of the oscillator and the enable signal to set the states of the full power signal FP and low power signal LP. The circuitry 900 includes an input 902 coupled to the oscillator signal OSC, which is the Q output of the flip-flop 334 of FIG. 3 or a device that generates the real switching frequency. The input 902 is coupled to switching circuitry 904 that includes a voltage source V91, an inverter 908, and first and second switches SW91 and SW92. The inverter 908 causes the first switch SW91 to open when the second switch SW92 is closed and vice versa. The switching circuitry 904 has an output node N91 coupled between the switches SW91 and SW92.

Node N91 is coupled to the input of a low-pass filter 910. The output of the low-pass filter 910 is a voltage $V_{FSW}$ that is proportional to the real switching frequency and is coupled to an input of a comparator 914. The voltage $V_{FSW}$ is compared to a voltage $V_{FSW\_LP}$ by the comparator 914. The voltage $V_{FSW\_LP}$ is a voltage that is proportional to the lower limit of the real switching frequency where the circuitry 900 generates the low power LP signal. The output of the comparator 914 is coupled to a first input of an AND gate 918. The second input of the AND gate 918 is coupled to the OSC signal by way of an inverter 920. The output of the AND gate 918 is coupled to the clock input of the D flip-flop 720. The output of the flip-flop 720 is coupled to circuitry described with reference to FIGS. 7 and 8.

The input 902 receives the OSC signal operating at the real switching frequency, which is coupled to a controller for the switch SW91 and the inverter 908, which is coupled to the switch SW92. The switches SW91 and SW92 switch at the real switching frequency generating a replica of the real switching frequency having an amplitude of the voltage V91 at the node N91. Node N91 is coupled to the input of the low-pass filter 910, which converts the real switching frequency to the voltage $V_{FSW}$. The voltage $V_{FSW}$ is input to the comparator 914, where it is compared to the voltage $V_{FSW\_LP}$. If the voltage $V_{FSW}$ is less than the voltage $V_{FSW\_LP}$, then the comparator 914 outputs a logic one to the AND gate 918. The other input of the AND gate 918 is a logic one when the OSC signal is a logic zero, meaning that transistor Q31, FIG. 3, is not conducting the current $I_{T1}$. Therefore, the AND gate 918 will only output a logic one when the real switching frequency is below a predetermined value set by the voltage $V_{FSW\_LP}$ and transistor Q31 is not set to conduct.

The output of the AND gate 918 is coupled to the clock input of the D flip-flop 720, which functions in the same manner as described with reference to FIG. 7. Accordingly, the low power signal LP is generated when the enable signal is low, indicating that the output voltage $V_{OUT}$ (or the voltage $V_{OUT\_SNS}$) of FIG. 3 is greater than the reference voltage $V_{REF32}$ and the output of the AND gate 918 is a logic one.

FIG. 10 is a schematic diagram of circuitry 1000 that is a variation of the circuitry 900 of FIG. 9. The circuitry 1000 receives the $T_{ON\_MAX}$ and $T_{OFF\_MIN}$ signals rather than the OSC signal received by the circuitry 900. The circuitry 1000 has an input 1002 that is coupled to the $T_{ON\_MAX}$ signal. The input 1002 is coupled to switching circuitry 904 that functions in the same manner as described with reference to FIG. 9. The circuitry 1000 includes a NOR gate 1004 that is coupled to an input of the AND gate 918 in place of the inverter 920 of FIG. 9. One input of the NOR gate 1004 is coupled to the $T_{OFF\_MIN}$ signal and the other input is coupled to the $T_{ON\_MAX}$ signal. The NOR gate 1004 outputs a logic one in response to both the $T_{OFF\_MIN}$ signal and the $T_{ON\_MAX}$ signal being low. The remainder of the circuitry 1000 functions in the same manner as the circuitry 900 of FIG. 9.

Reference is made to FIG. 3 where the power control circuitry 102 as applied to the power supply 300 will now be described. The power control circuitry 102 receives the OSC signal as the Q output of the flip-flop 334 and the enable signal generated by the comparator 324. Based on the descriptions provided above, the power control circuitry 102 generates the full power signal FP and the low power signal LP. The full power signal FP is coupled to the OR gate 340 by way of the inverter 342, so as not to trigger the reset signal of the flip-flop 336 unless the full power signal FP is low. The low power signal LP is coupled to the power management circuitry 352, where it causes the power management circuitry 352 to remove the bias voltage from certain components within the power supply 300. Removing the bias voltage from the components significantly reduces the current IDD drawn by the control circuitry 310.

Reference is made to FIG. 5 where the power control circuitry 502 will now be further described. The power control circuitry 502 receives the $T_{ON\_MAX}$ and $T_{OFF\_MIN}$ signals and the enable signal generated by the comparator 324. Based on the descriptions provided above, the power control circuitry 502 generates the full power signal FP and the low power signal LP. The full power signal FP is coupled to an input of the AND gate 514, so as to require the full power signal FP to be high when the control circuitry 502 drives transistor Q31. The low power signal LP is coupled to the power management circuitry 352, where it causes the power management circuitry 352 to remove the bias voltage from certain components within the power supply 500.

Reference is made to the delay 722 of FIGS. 7-10, which delays the full power signal FP relative to the low power signal LP. The low power signal LP turns off certain components when the power supply 100/300 is operating at a low switching frequency and other conditions are met, such as the output voltage $V_{OUT}$ (or the voltage $V_{OUT\_SNS}$) being greater than the reference voltage $V_{REF32}$. When the signal LP goes low the above-described components are turned on. Unfortunately turning on these components requires some time before they can be used. Switching is enabled when the full power signal FP is high, which occurs after a delay set by the delay 722 from the time the low power signal LP transitions low. The full power signal FP signal does not turn on the components that were disabled when in low power mode, but rather indicates that all the components that were disabled when in low power mode are now fully operative so the switching may be enabled. The delay 722 prevents switching from occurring before the other components have been fully enabled or activated. If the circuits are operating at high switching frequency, the components would need to turn on and off at a rate that is too high compared to the time required for turning on these components. Accordingly, the above-described components are only turned off when the switching frequency is low.

Figure 11:
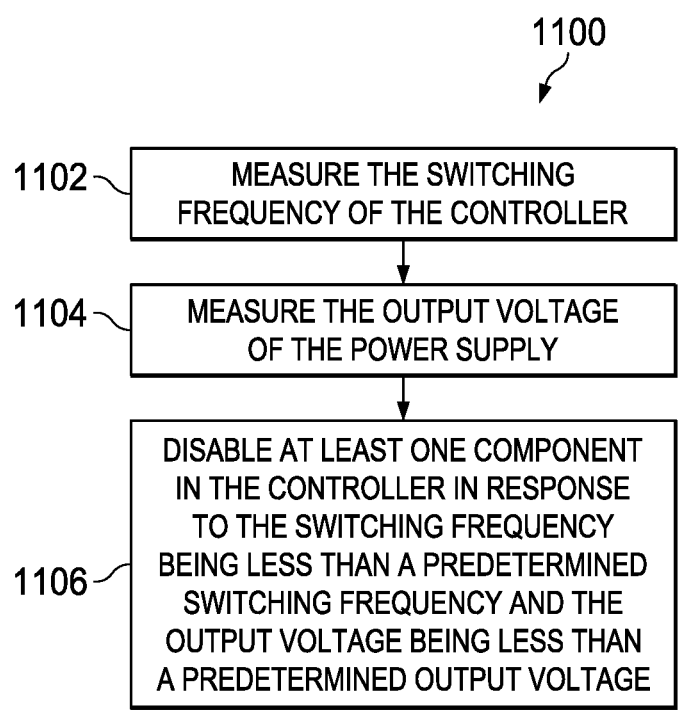
FIG. 11 is a flowchart illustrating a method for operating a controller for a switching power supply operating with an on/off control.

FIG. 11 is a flowchart 1100 illustrating a method for operating a controller for a switching power supply operating with an on/off control as described herein. At step 1102, the switching frequency of the controller is measured. The output voltage of the power supply is measured at step 1104. Step 1106 includes disabling at least one component in the controller in response to the switching frequency being less than a predetermined switching frequency and the output voltage being less than a predetermined output voltage.

Although illustrative embodiments have been shown and described by way of example, a wide range of alternative embodiments is possible within the scope of the foregoing disclosure.

What is claimed is:

1. A controller for a switching power supply, the controller comprising:
    comparison circuitry operable to compare a switching frequency for the switching power supply to a predetermined switching frequency;
    voltage measuring circuitry operable to measure the output voltage of the power supply; and
    disabling circuitry operable to disable at least one component in the power supply in response to the switching frequency being less than the predetermined switching frequency and the output voltage being greater than a predetermined output voltage.

2. The controller of claim 1, wherein the comparison circuitry includes:
    a timer having a reset input coupled to receive an oscillation signal having the switching frequency, and an inverted output; and
    an AND gate having a first input coupled to the inverted output, a second input coupled to receive an inverted version of the oscillation signal, and an output.

3. The controller of claim 2, wherein the comparison circuitry includes:
    an inverter having an input coupled to receive the oscillation signal, and an inverter output; and
    a delay component coupled between the inverter output and the second input of the AND gate.

4. The controller of claim 1, wherein the comparison circuitry includes a comparator having a first input coupled to receive a first signal correlated to the switching frequency and a second input coupled to receive a second signal correlated to the predetermined switching frequency.

5. The controller of claim 1, wherein the comparison circuitry includes:
   a timer having a reset input coupled to receive a first signal correlated to an on-time of the switching power supply, and an inverted output; and
   an AND gate having a first input coupled to the inverted output, a second input coupled to receive a second signal correlated to the on-time and an off-time of the switching power supply, and an output.

6. The controller of claim 5, wherein the comparison circuitry includes:
   a NOR gate having a first input coupled to receive the first signal, a second input coupled to receive a third signal correlated to the off-time of the switching power supply, and an output configured to output the second signal; and
   a delay component coupled between the output of the NOR gate and the second input of the AND gate.

7. A method for operating a controller for a switching power supply operating with an on/off control method at a switching frequency, the method comprising:
   measuring the switching frequency of the controller;
   measuring the output voltage of the power supply; and
   disabling at least one component in the controller in response to the switching frequency being less than a predetermined switching frequency and the output voltage being greater than a predetermined output voltage.

8. The method of claim 7, wherein the controller includes a switch that conducts during conduction periods and does not conduct during other periods; and wherein the disabling includes disabling current flow through the switch during the other periods.

9. The method of claim 8, wherein the switch is a switching transistor and wherein disabling the switch includes disabling the gate current of the switching transistor.

10. The method of claim 8, wherein the switch is a switching transistor and wherein disabling the switch includes disabling all current flow through the switching transistor.

11. The method of claim 7, wherein measuring the switching frequency of the controller comprises converting the average switching frequency of the controller to a switching signal and comparing the switching signal to a signal correlated to the predetermined switching frequency.

12. A switching power supply comprising:
    an oscillator operable to generate a reference for a switching frequency;
    a switch that turns on and off in response to the switching frequency, wherein the switch conducts current for generating an output voltage of the power supply;
    comparison circuitry operable to compare the switching frequency of the switch to a predetermined switching frequency;
    voltage measuring circuitry operable to measure the output voltage of the power supply; and
    disabling circuitry operable to disable at least one component in the power supply in response to the switching frequency being less than the predetermined switching frequency and the output voltage being greater than a predetermined output voltage.

13. The power supply of claim 12, wherein the comparison circuitry includes:
    a timer having a reset input coupled to receive an oscillation signal having the switching frequency, and an inverted output; and
    an AND gate having a first input coupled to the inverted output, a second input coupled to receive an inverted version of the oscillation signal, and an output.

14. The power supply of claim 13, wherein the comparison circuitry includes:
    an inverter having an input coupled to receive the oscillation signal, and an inverter output; and
    a delay component coupled between the inverter output and the second input of the AND gate.

15. The power supply of claim 12, wherein the comparison circuitry includes a comparator having a first input coupled to receive a first signal correlated to the switching frequency and a second input coupled to receive a second signal correlated to the predetermined switching frequency.

16. The power supply of claim 12, wherein the comparison circuitry includes:
    a timer having a reset input coupled to receive a first signal correlated to an on-time of the switching power supply, and an inverted output; and
    an AND gate having a first input coupled to the inverted output, a second input coupled to receive a second signal correlated to the on-time and an off-time of the switching power supply, and an output.

17. The power supply of claim 16, wherein the comparison circuitry includes:
    a NOR gate having a first input coupled to receive the first signal, a second input coupled to receive a third signal correlated to the off-time of the switching power supply, and an output configured to output the second signal; and
    a delay component coupled between the output of the NOR gate and the second input of the AND gate.

* * * * *